United States Patent
Kiriansky

(10) Patent No.: US 9,665,498 B2
(45) Date of Patent: May 30, 2017

(54) MEMORY MANAGEMENT USING TRANSPARENT PAGE TRANSFORMATION

(75) Inventor: Vladimir L. Kiriansky, Alameda, CA (US)

(73) Assignee: VMware, Inc., Palo Alto, CA (US)

(*) Notice: Subject to any disclaimer, the term of this patent is extended or adjusted under 35 U.S.C. 154(b) by 1135 days.

(21) Appl. No.: 12/182,989

(22) Filed: Jul. 30, 2008

(65) Prior Publication Data

US 2010/0030998 A1    Feb. 4, 2010

(51) Int. Cl.
  *G06F 12/10*    (2016.01)
  *G06F 17/30*    (2006.01)

(52) U.S. Cl.
  CPC ........ *G06F 12/10* (2013.01); *G06F 2212/401* (2013.01)

(58) Field of Classification Search
  CPC .................................................. G06F 12/10
  USPC ................................................... 711/154
  See application file for complete search history.

(56) References Cited

U.S. PATENT DOCUMENTS

| | | | |
|---|---|---|---|
| 6,167,490 A * | 12/2000 | Levy et al. | 711/148 |
| 7,650,352 B2 * | 1/2010 | Fuh et al. | 707/696 |
| 7,721,064 B1 * | 5/2010 | Lam et al. | 711/170 |
| 7,739,250 B1 * | 6/2010 | Hamilton et al. | 707/690 |
| 2006/0161751 A1 * | 7/2006 | Barrs et al. | 711/170 |
| 2007/0094312 A1 * | 4/2007 | Sim-Tang | 707/204 |
| 2007/0288533 A1 * | 12/2007 | Srivastava et al. | 707/203 |
| 2008/0005489 A1 * | 1/2008 | Watkins et al. | 711/147 |
| 2009/0049271 A1 * | 2/2009 | Schneider | 711/206 |

* cited by examiner

*Primary Examiner* — Yaima Rigol
*Assistant Examiner* — Gautam Sain

(57) ABSTRACT

Memory space is managed to release storage area occupied by pages similar to stored reference pages. The memory is examined to find two similar pages, and a transformation is obtained. The transformation enables reconstructing one page from the other. The transformation is then stored and one of the pages is discarded to release its memory space. When the discarded page is needed, the remaining page is fetched, and the transformation is applied to the page to regenerate the discarded page.

14 Claims, 3 Drawing Sheets

MEMORY MANAGEMENT USING TRANSPARENT PAGE TRANSFORMATION

BACKGROUND

Most modern computers include at least one form of data storage that has programmable address translation or mapping. In most computers, this storage will be provided by a relatively high-speed system memory, which is usually implemented using random-access memory (RAM) components (DRAM and SRAM).

Although system memory is usually fast, it does have its weaknesses. First, it is usually volatile. Second, for a given amount of data to be stored, system memory takes up more physical space within the computer, is more expensive, and requires more support in terms of cooling, component sockets, etc., than does a conventional non-volatile storage device such as a disk. Thus, whereas many gigabytes of disk storage are commonly included in even computers in the relatively unsophisticated consumer market, such computers seldom come with more than a few GB of system RAM.

Because higher speed access to stored data and code usually translates into faster performance, it is generally preferable to run as much of an active application from system memory as possible. Indeed, many applications requiring real-time processing of complex calculations, such as voice-recognition software, interactive graphics, etc., will not run properly or run at all unless a certain amount of RAM is reserved for their use while running.

High-speed system memory is a limited resource and, as with most limited resources, there is often competition for it. This has become an even greater problem in modern multi-tasked systems, in which several applications may be running or, at least resident in memory, at the same time. Even where there is enough memory in a given system for all of the applications that need it, it is still often advantageous to conserve memory use: RAM costs money, and consumes both energy and physical space. More efficient management of RAM can reduce the cost, energy, or physical space required to support a given workload. Alternatively, more efficient management of RAM can allow a system to support a larger number of applications with good performance, given a fixed monetary, energy, or physical space budget.

Using known virtualization techniques, multiple virtual machines (VMs), each having a guest operating system, may share a single physical host. When several VMs are executing on one physical host, there is an opportunity for consolidating memory as various VMs may use identical or similar pages. One technique for reducing the amount of system memory required for a given workload, and thereby for effectively "expanding" the amount of available system memory, is to implement a scheme whereby different VMs share the memory space. Transparent page sharing, in the context of a multi-processor system on which virtual machines are running, is one known method for saving RAM space. The basic idea is to save memory by eliminating redundant copies of memory pages, such as those that contain program code or file system buffer cache data. This is especially important for reducing memory overheads associated with running multiple copies of operating systems (e.g., multiple guest operating systems each running in a respective virtual machine). Further related information is provided in U.S. Pat. No. 6,075,938, to Bugnion, et al., "Virtual Machine Monitors for Scalable Multiprocessors," issued 13 Jun. 2000 ("Bugnion '938").

According to another technique, the contents of pages in memory are hashed and their hash numbers are compared to identify potentially identical pages. The entire content of potentially positive candidates is compared to verify that they store identical content. When identical pages are found, only one is selected and protected by using a known copy-on-write (COW) technique, while the other page is eliminated to free the memory space. This technique is particularly advantageous in that it does not require any modification of the guest operating system (OS). Further relevant information is described in U.S. Pat. No. 6,789,156, to Waldspurger, "Content-Based, Transparent Sharing of Memory Units," issued Sep. 7, 2004.

SUMMARY

The following summary of the invention is intended to provide a basic understanding of the memory management described herein.

Memory is managed so as to reduce redundant data storage without having to rely on identical content of pages. For example, two similar pages are selected and a transformation is obtained. The transformation enables reconstructing one page from the other. The transformation is then stored and one of the pages is discarded to release its memory space. When the discarded page is needed, the remaining page is fetched, and the transformation is applied to the page to regenerate the discarded page. The memory management may be executed by, e.g., the operating system of a non-virtualized computer system or a guest operating system in a virtual machine, virtualization software, etc.

BRIEF DESCRIPTION OF THE DRAWINGS

The accompanying drawings, which are incorporated in and constitute a part of this specification, together with the description, serve to explain and illustrate principles of the invention. The drawings are intended to illustrate major features in a diagrammatic manner. The drawings are not intended to depict every feature of actual embodiments.

DETAILED DESCRIPTION

The inventor of the subject invention has noted that conventional methods for memory consolidation cannot be used in cases where Address Space Layout Randomization (ASLR) is enabled. ASLR is a computer security technique which involves arranging the positions of key data areas, usually including the base of the executable and position of libraries, heap, and stack, randomly in a process' address space. Microsoft's Windows Vista and Windows Server 2008 have ASLR enabled by default, while Apple introduced randomization of some library offsets in Mac OS X v10.5.

The inventor of the subject invention has noted that any address constructed by a running program and present in either code or data will be different while ASLR is enabled. Therefore, when ASLR is enabled, even if two processes represent the same content in RAM, due to ASLR's randomization, most stored pages that contain addresses are unlikely to be identical (especially when running in different virtual machines). Consequently, memory consolidation methods that rely on content hash value comparison or on actual content comparison of pages would fail to identify such similar pages, and therefore fail to provide a mechanism for consolidating the memory. That is, conventional techniques are not applicable if the content of two almost identical pages differ even in a single byte. Moreover, there is no way in the art to share only a subset of a page, partly due to limited granularity of current CPU's memory management units (MMU), since the minimum unit of sharing is typically a single 4 KB page.

Various embodiments of the invention are generally directed to methods for management of memory so as to reduce redundant data storage without having to rely on identity of pages. According to methods of the invention, pages having substantial similarities are identified, and consolidation methods are applied to the pages so as to reduce memory utilization by discarding redundant pages. Pointers and/or transformations are stored so as to be able to reconstruct the discarded pages when needed.

Figure 1:
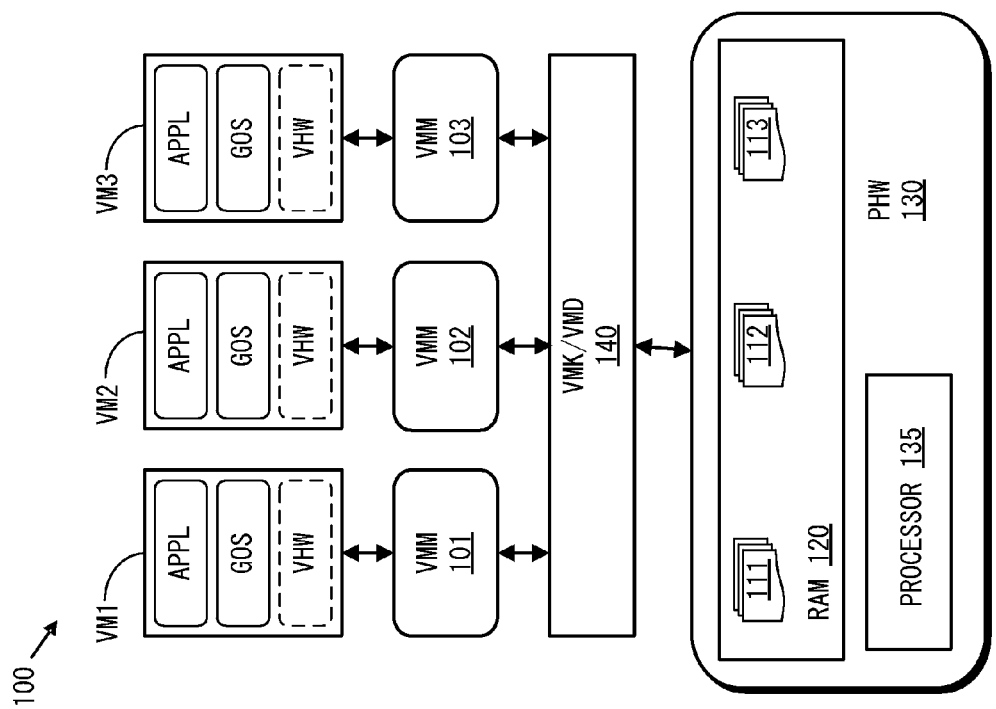
FIG. 1 illustrates an example of a virtualized computer system.

FIG. 1 illustrates an example of a system benefiting from implementation of embodiments of the invention. In FIG. 1 computing system 100 comprises physical hardware PHW 130, which includes memory, e.g., RAM 120, and processor 135. In this example, three virtual machines VM1, VM2 and VM3 run on the physical hardware 130. Each virtual machine VM1, VM2, VM3 comprises virtual hardware VHW, a guest operating system, GOS, and one or more applications APPL running thereon. Virtualization software may include one or more layers of software logically interposed between and interfacing with physical hardware 130 and each VM. Virtualization software can include, for example, a virtual machine monitor VMM 101, 102, 103, for each virtual machine and a VM kernel (VMK) or virtual machine driver (VMD), as generally known in the field of virtualization. The VM kernel, or for hosted implementation, the VM driver, is illustrated as block VMK/VMD 140. Both the OS and any running application requires certain pages to be stored in memory 120. The storage of the pages is managed by virtual memory manager 101, 102, and 103. As can be understood, if two VM's run the same OS, they would store duplicate pages in memory 120, thereby needlessly consuming memory capacity. As noted above, the present inventor has noted that conventional methods for eliminating such duplication of pages cannot be utilized when, for example, ASLR is enabled or when the pages are otherwise not totally identical. Therefore, in this example, similar pages are identified and a transformation procedure is implemented to allow discarding one of two similar pages.

Figure 2:
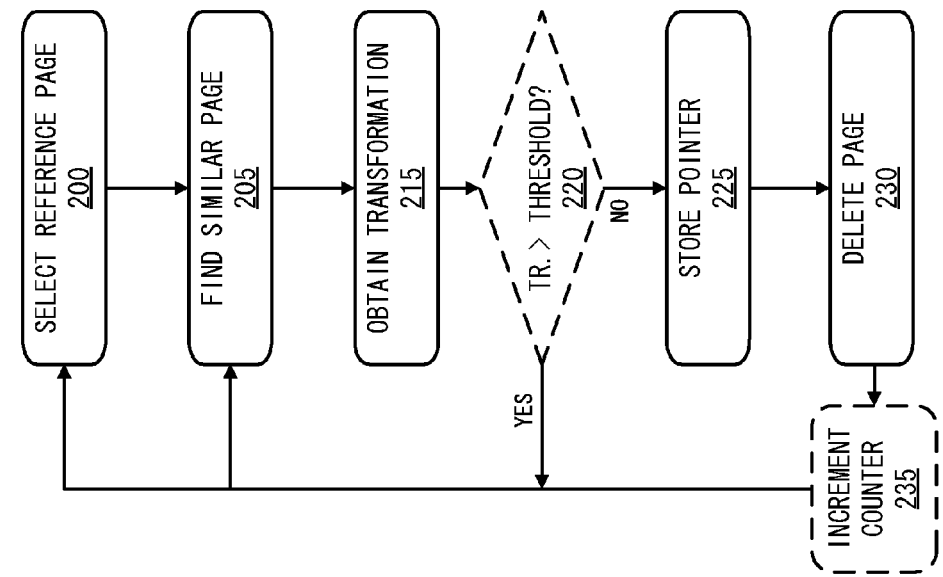
FIG. 2 is a high-level flow chart illustrating, by way of example, a process for reducing redundant data storage.

FIG. 2 is a high-level flow chart illustrating a process according to an embodiment of the invention. In step 200 one of the pages is selected to serve as a reference page. Then, at step 205, a search is made to identify similar pages to the reference page. Finding similar pages may be done in one or more steps. For example, similar pages may be found in a single step by simply comparing the entire content of all pages in the memory to the reference page. The order of pages to be compared may be determined by randomly selecting pages for comparison with the reference page, applying heuristics for selecting pages for comparison, etc. On the other hand, finding similar pages may be a two-step process. For example, in a first step the pages' headings may be compared to identify potentially similar pages. The first step is then followed by a second "verification" step in which the entire content of the identified candidate pages is compared to verify that the pages are indeed similar.

When two similar pages are identified, at 215 a transformation is obtained to enable subsequent generation of one page from the other by applying a reverse transformation. Various manners for obtaining the transformation are detailed further below. According to this embodiment, after a transformation is obtained an optional comparison step 220 is implemented to check whether storing the transformation would require an unacceptable memory space. For example, the size of the transformation may be compared to the size of the similar page, to a preset threshold, to the size of the similar page less a buffer amount, etc. If it was determined that the size of the transformation is too large, the process reverts to step 200 to select another reference page, or to step 205 for searching another similar page. Whether to revert to step 200 or step 205 can be pre-programmed beforehand and the selection may depend on various parameters, e.g., if all pages were already compared to the reference page, the process may revert to step 200, while if not all pages were compared to the reference page, the process may revert to step 205. It should be appreciated, however, that step 220 may be incorporated into, and performed at the same time that, step 215 is performed. Such an arrangement would enable aborting the transformation early, i.e., when it becomes clear that it would require too much memory space to store.

If in step 220 it was determined that the size of the transformation is acceptable, or if step 220 is not implemented, the transformation is stored at step 225 and the similar pages is discarded at step 230, so that its memory space may be released as an available resource. In this regard, if the transformation has been previously stored, a pointer to the storage location of the transformation may be stored instead of re-storing the transformation itself, and a corresponding optional reference counter may be incremented at 235 to track the pointers. The process then reverts to step 200 or 205, according to the program, as explained above.

Figure 3:
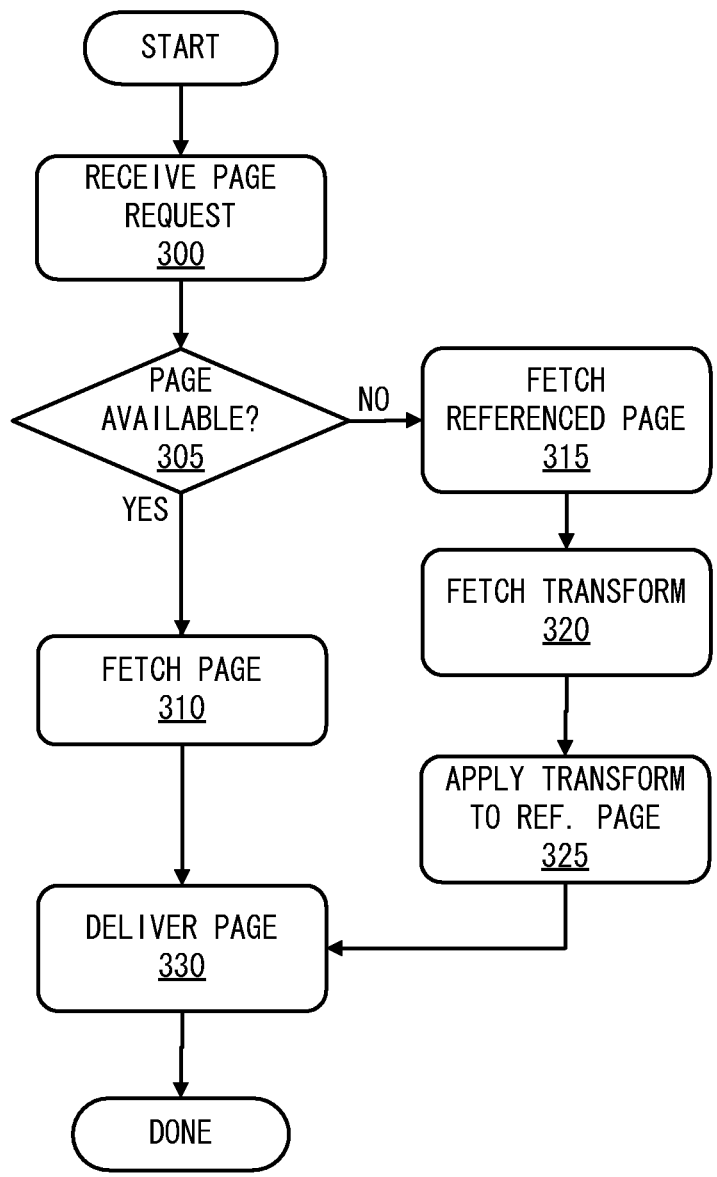
FIG. 3 is a high-level flow chart illustrating, by way of example, a process for fetching a stored page or regenerating a discarded page.

FIG. 3 is a high-level flow chart illustrating, by way of example, a process for fetching a stored page. When an application attempts to access a page, the request is received at step 300. If the page exists in the memory (i.e., yes at step 305) the page is fetched at 310 and is delivered at step 330. On the other hand, if it is a page that was previously discarded for memory conservation, the reference page is fetched at 315 and the corresponding transformation is fetched at 320. The transformation is then applied to the reference page at 325. The transformation may be applied to the reference page itself in place, or in a copy of the reference page, to thereby reconstitute the discarded page. The reconstituted page is then delivered at 330.

For example, VM1 may need access to a specific page, so the translation tables in VMM1 are checked by processor 135 for the proper address in memory space 111 of RAM 120. However, when the page has been deleted due to the memory management process, a page fault is issued. The VMK/VMD 140 then executes the process to reconstitute the page from the reference and the stored transformation. The process may also be implemented when all of the memory needs to be reconstituted, e.g., for taking a VM snapshot to write all memory to disk, for migrating a VM to another host, etc. Of course, rather than reconstituting the pages, if a reference page is already present in the snapshot or in the migrated copy, a transformation pointer may be recorded instead.

Figure 4:
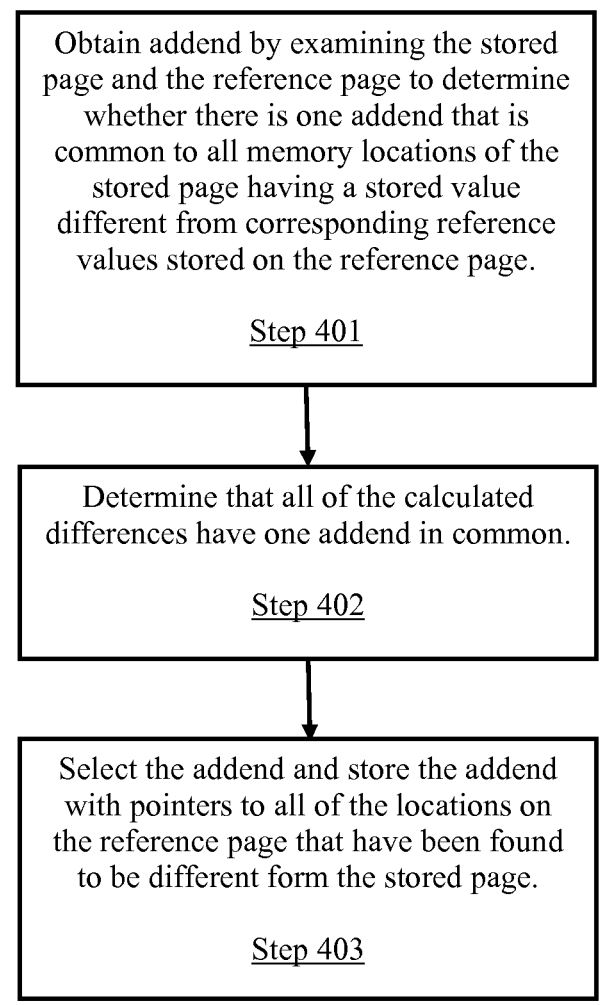
FIG. 4 is a high-level flow chart illustrating, by way of example, a process for obtaining transformation information by which a stored page can be re-created from a reference page.

According to one embodiment, referred to herein as relocation transformation, a stored page similar to a reference page is identified. An addend enabling transformation of the reference page to the stored page is obtained. The addend may have been previously stored, e.g., after performing a prior transformation, previously stored by the OS, etc. This transformation is most applicable to code or read only pages of an executable or a library that are relocated at different addresses in different processes. According to one embodiment, as shown in FIG. 4, the addend is obtained by examining the stored page and the reference page to determine whether there is one addend that is common to all memory locations of the stored page having a stored value different from corresponding reference values stored on the reference page (step 401). For example, the difference can be calculated for each stored value that is different from a corresponding reference value. If all of the calculated differences have one addend in common (step 402), the addend is selected and is stored (step 403), together with pointers to all of the locations on the reference page that have been found to be different from the stored page.

In some cases there may be more than one addend, however, so long as one addend is common to all locations, it may be selected as the addend for the reconstruction of the page. For example, one may consider the following two strings from two pages:

Reference page: 00 12 34 56 78 9A BC
Stored page: 00 12 34 57 78 9A BC

When one compares the first 4 bytes of each string, one may obtain the difference (potential addend) as being 0x0001. On the other hand, if the comparison is made starting at the second byte, one gets the difference to be 0x0100. Therefore, the comparison needs to proceed over all the entries of the two pages to find all possible differences. Then all of the differences need to be examined to determine whether there is at least one addend that is common to all of the differences. For the above case, either 0x0001 or 0x0100, with the appropriate pointer, can be used as an addend.

The addend is then stored together with a string indicating all locations on the reference page where the addend should be applied in order to reconstruct the stored page. The stored page can then be dropped. When a process attempts to access the dropped page, the reference page is retrieved and transformed using the stored locations and the addend value. This method is highly scalable, as for example, for n similar pages one only need to store any page as a reference page, one set of addend locations, and one addend value for each page, which require very little memory space and, for example, a total of 2 pages of memory can fully describe 100 to 1000 pages.

According to another embodiment, referred to herein as delta transformation, a page is compared to a reference, and a set of vectors, each comprising a location value and an addend value, are stored. The page is then dropped. When a process attempts to access the dropped page, the reference page is retrieved and transformed using the vector set. While this embodiment reduces memory space whenever the vector size is smaller than a page size, it is less economical than the relocation transformation embodiment, as for n views it requires n vector sets. However, it is a more general transformation as there are more opportunities for finding such 'similar' data pages, since each vector may be associated with different addend. That is, the requirement for finding a common addend for the entire page is obviated.

Other more specialized transformation functions may also be applicable in some more limited scenarios. A page may be described simply as a truncated version of another page, and only needs to store the last nonzero position; or as the shifted content of another page. More generally, a single page can be described by random subsequences of content present in multiple other pages. Additional transformations on the content of otherwise identical pages may be XORed with a random cookie value, and only that random value needs to be stored; or similarly the initialization vector of a block cipher may be stored if pages are encrypted.

Any future transformation functions can be used in a manner similar to this invention. Viable transformation functions need to use substantially less memory to fully reconstruct the content of multiple pages; must keep latency on reconstructing pages on demand competitive to alternative backing store and add minimal CPU overhead; and require minimal resource utilization for identifying reference pages.

It should be understood that if the differences between the stored page and the references page are large, storing the transformation information may require unacceptable memory space and reconstructing the page may require too much computational resources. Therefore, a certain test may be set to ensure that the inventive process actually saves memory space and also does not overload the system. For example, a threshold may be set that sets up a minimum memory savings, below which the stored page is not discarded. The size of the transformation information may then be examined and the transformation may be stored only if storage saving resulting from discarding the stored page and storing the transformation information surpasses a threshold. One also needs to track the CPU and memory utilization costs of identifying similar pages according to the transformation functions for the whole system to be effective and potentially dynamically trade off between choices of functions and throttle their aggressiveness.

It should also be appreciated that the size of the transformation information depends on the resolution or granularity of the pointer, i.e., the selection of the size of the addend. For example, considering a location of 4 bytes, if only one is different and we select the addend to be four-byte size, then we waste 3 bytes for storing identical data. Therefore, it may be better to use a 1-byte size addend. On the other hand, if we select an addend of one-byte size, and three of the four bytes are different, we will have to store three indexes and three 1-byte addends, thereby consuming more memory for index storage.

The resolution selection of the pointer depends on the density of the expected changes on the pages, i.e., if a bit change is expected, a bit mode delta should be used, if a byte change is expected, a byte mode delta should be used, and if word change is expected, then words delta should be used. Different resolution may be selected when relocation transformation or delta transformation are implemented. For relocation transformation, which is more proper for ASLR, the addend size would depend on the size of the address used by the OS. For example, in 32-bit Linux a 4-byte selection is proper, but since Windows OS always keeps the lower 2-bytes the same, one may use a 2-byte granularity, although 4-byte would work as well.

For delta transformation the selection would depend on the expected change and may be set to the same granularity for all the pages, different for every page, or even different for every location within the page. However, selecting different size for each location may cause increase in memory usage, as for each location we will have to indicate the size of the transformation (generally two extra bits), so it may be more beneficial to select one size for the entire page. Moreover, if several VMs are running, each may be set differently. Similarly, different size can be selected for each host.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the server arts. It is intended that the specification and examples be considered as exemplary only, with a true scope and spirit of the invention being indicated by the following claims.

We claim:

1. A non-transitory computer readable storage medium embodying software instructions for managing memory space, the software instructions causing a computer to perform a method, the method comprising the steps of:

identifying a page, within a memory space of a random access memory that is managed in units of pages, that is similar, but not identical, to a reference page within said memory space, wherein the identified page and the referenced page are each a single page in said memory space;

obtaining transformation information enabling re-creation of the identified page from the reference page;

storing at least one of the transformation information or a pointer to the transformation information; and, deleting the identified page, wherein the step of obtaining the transformation information comprises calculating a set of vectors, each vector comprising an addend location and an addend, the addend location identifying a location in the identified page having a stored present value different from a reference value stored at a corresponding location on the reference page, the addend equaling a difference between the stored present value and the stored reference value.

2. A non-transitory computer readable storage medium embodying software instructions for managing memory space, the software instructions causing a computer to perform a method, the method comprising the steps of:

identifying a page, within a memory space of a random access memory that is managed in units of pages, that is similar, but not identical, to a reference page within said memory space, wherein the identified page and the referenced page are each a single page in said memory space;

obtaining transformation information enabling re-creation of the identified page from the reference page;

storing at least one of the transformation information or a pointer to the transformation information; and, deleting the identified page, wherein the step of obtaining the transformation information comprises determining one addend that is common to all memory locations of the identified page having a stored present value different from corresponding reference values stored on the reference page, the one addend equaling a difference between each of the stored present values and each of the corresponding stored reference values.

3. The non-transitory computer readable storage medium of claim 2, wherein the step of storing the transformation information comprises storing the one addend and the memory locations of the identified page having a stored present value different from corresponding reference values stored on the reference page.

4. The non-transitory computer readable storage medium of claim 3, wherein the step of deleting of the identified page comprises releasing the memory space occupied by the identified page.

5. The non-transitory computer readable storage medium of claim 3, wherein the method further comprises the steps of fetching the reference page and applying the transformation information to the reference page to regenerate the identified page on attempts to access the identified page.

6. The non-transitory computer readable storage medium of claim 3, wherein the step of identifying of the page comprises applying heuristics to a plurality of pages to identify a page that is similar to the reference page.

7. The non-transitory computer readable storage medium of claim 6, wherein the step of applying heuristics comprises comparing page headers of the plurality of pages.

8. The non-transitory computer readable storage medium of claim 3, wherein the step of identifying the page comprises randomly selecting at least one of the identified page and the reference page from a plurality of pages.

9. The non-transitory computer readable storage medium of claim 3, wherein the step of obtaining the transformation information comprises fetching previously calculated transformation information from a storage location and maintaining a reference counter to ensure one copy is in memory.

10. The non-transitory computer readable storage medium of claim 3, wherein the method further comprises the steps of:

examining a size of the transformation information and performing the storing step only if storage saving resulting from discarding the identified page and storing the transformation information exceeds a threshold.

11. The non-transitory computer readable storage medium of claim 3, wherein:

the computer comprises a virtualized computer system having virtualization software logically interposed between and interfacing with computer hardware and at least one virtual machine having a guest operating system and at least one application, the virtualization software comprising the software instructions for managing the memory space; and the steps of identifying the page, obtaining the transformation information, the storing the at least one of the transformation information or the pointer, and deleting are performed by the virtualization software in the virtualized computer system.

12. The non-transitory computer readable storage medium of claim 3, further comprising the step of:

selecting a size of the addend prior to obtaining of the transformation information.

13. The non-transitory computer readable storage medium of claim 12, wherein the size of the addend is selected based on an expected size of differences between the identified page and the reference page.

14. The non-transitory computer readable storage medium of claim 12, wherein the size of the addend is selected based a memory address size used by an operating system of the computer.

* * * * *